(12) United States Patent
Zamuner (10) Patent No.: US 7,800,017 B2
(45) Date of Patent: Sep. 21, 2010

(54) INTEGRAL HANDLE

(75) Inventor: Frank Zamuner, Oakville (CA)

(73) Assignee: Lincoln Global, Inc., Montery Park, CA (US)

( * ) Notice: Subject to any disclaimer, the term of this patent is extended or adjusted under 35 U.S.C. 154(b) by 1314 days.

(21) Appl. No.: 11/274,953

(22) Filed: Nov. 15, 2005

(65) Prior Publication Data
US 2007/0108173 A1 May 17, 2007

(51) Int. Cl.
*B23K 9/173* (2006.01)
(52) U.S. Cl. .............................. 219/137.2; 219/137.31; 219/124.02; 226/168
(58) Field of Classification Search ............ 219/137.31, 219/137.42–137.44, 137.51, 137.52, 137.61–137.63
See application file for complete search history.

(56) References Cited

U.S. PATENT DOCUMENTS

| | | | | |
|---|---|---|---|---|
| 3,744,694 A | * | 7/1973 | Karnes et al. ................ | 226/168 |
| 3,980,860 A | | 9/1976 | Howell et al. | |
| 4,656,329 A | | 4/1987 | Moerke | |
| 5,079,404 A | | 1/1992 | Zamuner | |
| 5,313,046 A | | 5/1994 | Zamuner | |
| 5,451,117 A | | 9/1995 | Lajoie | |
| 5,595,671 A | * | 1/1997 | David ..................... | 219/137.62 |
| 5,639,056 A | * | 6/1997 | Mecalf ........................ | 248/523 |
| 5,841,105 A | * | 11/1998 | Haczynski et al. ..... | 219/137.31 |
| 6,075,227 A | | 6/2000 | Lajoie | |
| 6,610,963 B2 | | 8/2003 | Zamuner | |
| 2004/0031781 A1 | * | 2/2004 | Zamuner ..................... | 219/138 |

FOREIGN PATENT DOCUMENTS

| | | |
|---|---|---|
| CA | 2053131 | 4/1992 |
| CA | 2106837 | 3/1994 |
| CA | 2139152 | 7/1995 |
| CA | 2338949 | 8/2004 |
| EP | 0 590 728 A1 | 6/1994 |
| GB | 2 214 598 A | 6/1989 |
| GB | 2 285 404 A | 12/1995 |

OTHER PUBLICATIONS

Canadian Office Action dated Oct. 3, 2008 relating to Application No. 2,567,511.
Chinese Office Action dated Nov. 7, 2008 relating to Application No. 200610162459.7.

* cited by examiner

*Primary Examiner*—Tu B Hoang
*Assistant Examiner*—Brian Jennison
(74) *Attorney, Agent, or Firm*—Hahn Loeser & Parks LLP (57) ABSTRACT

A welding gun assembly for directing a welding wire toward a workpiece, having a torch at a forward portion of the gun; a welding wire feeder at a rearward portion of the gun; and handles positioned adjacent the torch and wire feeder. Each handle has a first, cylindrical portion and a second, hexagonally shaped portion adjacent the first, cylindrical portion. The hexagonal portion has a cylindrical opening and a hexagonal opening adjacent the cylindrical opening. The handle further has an extension member having an access opening therein. A conduit is connected to each handle.

50 Claims, 9 Drawing Sheets

INTEGRAL HANDLE

BACKGROUND

The invention relates to the art of electric arc welding and more particularly to an improved handle for a welding gun between a wire feeder and a torch for the welding operation.

INCORPORATION BY REFERENCE

The design of a welding gun is the subject of many patents that describe the background of the present invention. Some of these patents and/or applications are United Kingdom Application No 2,285,404; Canadian Application No. 2,106,837; Canadian Application No. 2,139,152; European Application No. 0 590 728 A1; and U.S. Pat. No. 5,313,046. These prior examples of the torch to which the present invention is directed are incorporated by reference herein as background information and to describe some of the attributes required for a torch of the type to which the invention is directed.

BACKGROUND OF THE INVENTION

In electric arc welding, a welding gun is a flexible, elongated element having a rear end connected to a wire feeder and a front end for a welding torch. The gun includes an elongated flexible conduit directing current and shielding gas from the wire feeder to the welding torch. Such a mechanism is employed for hand held welding and for robotic controlled welding in the trade.

The torch includes a contact tip through which the welding wire is directed from the wire feeder through the flexible tube to the welding operation. This tip is supported in a conductive cylindrical assembly receiving power from the wire feeder.

Shielding gas is directed from a diffuser in the cylindrical assembly into a chamber defined by an outer nozzle through the nozzle into the area around the contact tip so the shielding gas forms a protective layer between the molten metal of the welding operation and atmosphere. All of these requirements of a torch require complex machined components at the end of the torch which substantially increases the cost and adversely affects the operability of the torch during the welding operation. Furthermore, the welding operation itself creates spatter, especially during short circuit conditions so the forward end of the torch including the contact tip and diffuser is subject to substantial deterioration over time caused by spatter together with the tremendous arc temperature involved in the welding operation.

Shielding gas is directed into the welding operation from diffuser orifices circumferentially spaced around the torch and directed ultimately to the contact tip at the welding operation. Consequently, torches have diffuser orifices for shielding gas; however, these orifices must be oriented to prevent unwanted cavitation. It has been found that these orifices should be as close as possible to the welding operation. Such closeness drastically increases the tendency for spatter to affect the laminar flow of shielding gas from the diffuser orifices.

Robotic assemblies are commonly used with welding guns. Previously, when robotic gun assemblies were dismantled, the down time was extensive because there was no quick and easy means to precisely reassemble the robotic gun. A previous example of a keyed alignment system for a welding torch used with a robotic gun assembly is shown in U.S. Pat. No. 5,451,117 which is hereby incorporated by reference. A mounting arm which provides for various methods of changing position of the welding gun with respect to the robotic arm and the position of the gun with respect to its housing as well as providing easy disassembly of the gun from the robotic arm is described in co-pending application Ser. No. 11/178,819, filed on Jul. 11, 2005, which is also incorporated herein by reference. Hex end structures for the torch end and welding wire feeder and are shown and described in co-pending application Ser. No. 11/268,085; filed on Nov. 7, 2005, which is hereby incorporated by reference.

Furthermore, a welding gun which allows for various positions of the forward end and rear end of the gun is needed without complete disassembly of the gun. Accordingly, it is considered desirable to provide a welding gun which allows various positions of the welding gun with respect to the robotic assembly and with respect to the handle without completely disassembling either the gun or the robotic arm assembly. Also, providing a handle which allows for ease in assembly and disassembly of the welding gun as well as providing access to the internal components of the gun at either the welding torch end or wire feeder end is also desired.

SUMMARY OF THE INVENTION

The present invention is directed to a welding gun. In particular, the invention is directed to a welding gun having an integral handle adjacent a welding torch and an integral handle adjacent a welding wire feeder.

In accordance with one aspect of the invention, a welding gun assembly, for directing a welding wire toward a workpiece has a torch at a forward portion of the gun, a welding wire feeder at a rearward portion of the gun, and a handle positioned adjacent the wire feeder. The handle has a first cylindrical portion and a second hexagonally shaped portion adjacent the first cylindrical portion. The hexagonal portion has a first opening and a second opening adjacent the first opening. The handle further has an extension member with an opening therein and a first conduit connected to the cylindrical portion of the handle.

In accordance with another aspect of the invention, a handle for use with a welding gun assembly for applying welding wire to a workpiece, has a first cylindrical portion and a second hexagonal portion. The second hexagonal portion has a first opening and a second opening adjacent the first opening and an extension member with an opening therein.

In accordance with yet another aspect of the invention, a handle assembly for use with a welding gun assembly for applying welding wire to a workpiece, has a handle with a hexagonal shaped portion and a cylindrical shaped portion and an adapter which is attached to the cylindrical shaped portion. The adapter has a first external diameter portion having grooves thereon to receive a coiled spring.

One advantage of the present invention is the provision of providing an integral handle without the need for screws or other fasteners. The handle is inserted into a conduit and clamped or threaded into place.

Another advantage of the present invention is the provision of providing an internal handle at either or both of the torch and wire feeder ends of the welding gun assembly.

Yet another advantage of the present invention is the provision of the integral handle being reversible or able to be installed in positions 180 degrees apart.

Still another advantage of the present invention is the provision of an integral handle having an opening formed therein to provide access to the internal components or a switch for the welding gun.

Yet another advantage of the present invention is the provision of an integral handle formed of two halves which enable the handle to be easily assembled, and installed and removed from the welding gun.

Still another advantage of the present invention is the provision of providing a coiled spring within the conduit and within an adapter which is installed into the integral handle to prevent kinking of the conduit hose.

Still other advantages and aspects of the invention will become apparent through the following description and the accompanying drawings.

BRIEF DESCRIPTION OF THE DRAWINGS

The invention may take form in certain components and structures, a preferred embodiment of which is illustrated in the accompanying drawings wherein.

DETAILED DESCRIPTION OF THE PREFERRED EMBODIMENTS

The apparatus shown in the accompanying drawings and described below are examples which embody the invention. It should be noted that the scope of the invention is defined by the accompanying claims, and not necessarily by specific features of exemplary embodiments.

For a welding operation of the type which the invention is concerned, it is the usual practice to provide a service station. This service station provides: a welding current of electricity; anti-oxidizing gas; a motor for feeding welding wire to the weld; and, optionally, a vacuum source for extracting fumes.

Figure 1:
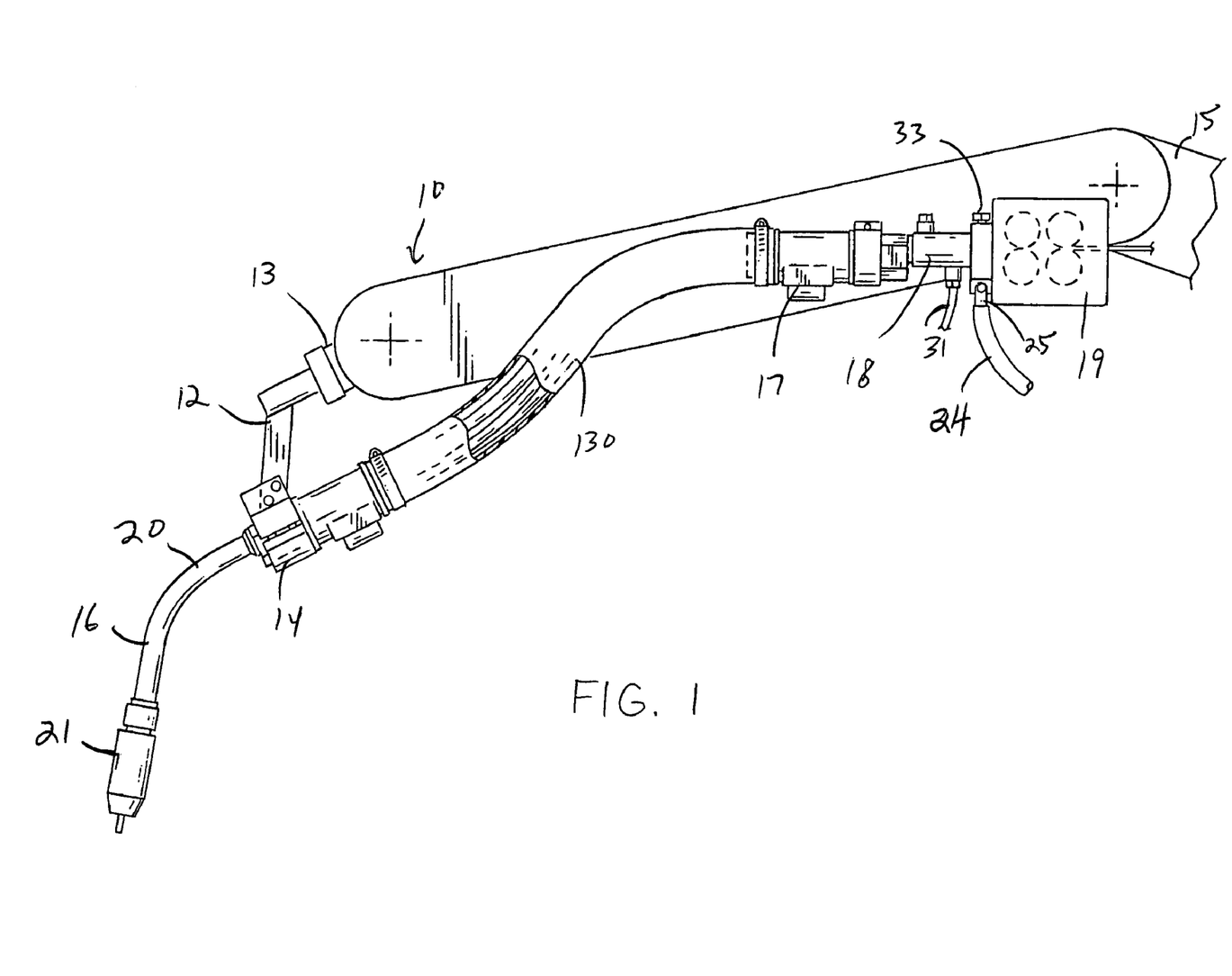
FIG. 1 is a side elevational view of a welding gun with integral handles adjacent a torch end and adjacent a welding wire feeder end.

Referring now to FIG. 1, a robotic arm assembly generally designated by the numeral 10 includes a welding gun mount arm 12, a welding gun front or first integral handle 14 and a welding torch assembly 16. The gun mount arm 12 is a precision made instrument, typically manufactured from an aluminum alloy, preferably from 6061 aluminum alloy or the like. The gun mount arm 12 of the preferred embodiment is rotatably secured at a distal end 13 to a remote robotic machine arm 15. The gun handle 14 is preferably made of a plastic that is capable of maintaining its shape under tight clamping pressure. The handle is installed at a first or front end of the gun assembly near the torch. A cylindrically shaped gun housing 18, preferably made of brass, is installed at a second, or rear end of the gun assembly adjacent a welding wire feeder assembly 19. A second integral handle 17, also formed of plastic, is installed adjacent housing 18.

The welding torch further includes a gooseneck 20 which can be an insulated, thick walled copper conductor tube that is wrapped in an aluminum or stainless steel jacket that is capable of dissipating heat quickly. The gooseneck extends from the front handle 14. Although the gooseneck 20 as shown in FIG. 1 is bent at a particular angle, the gooseneck may be manufactured to be straight or bent at any desired angle. The torch of the preferred embodiment further comprises a thick walled nozzle 21 machined from hard drawn copper and typically has a highly conductive copper tip. The arrangement of the nozzle 21 is conventional and accordingly is not described in detail herein.

Figure 2:
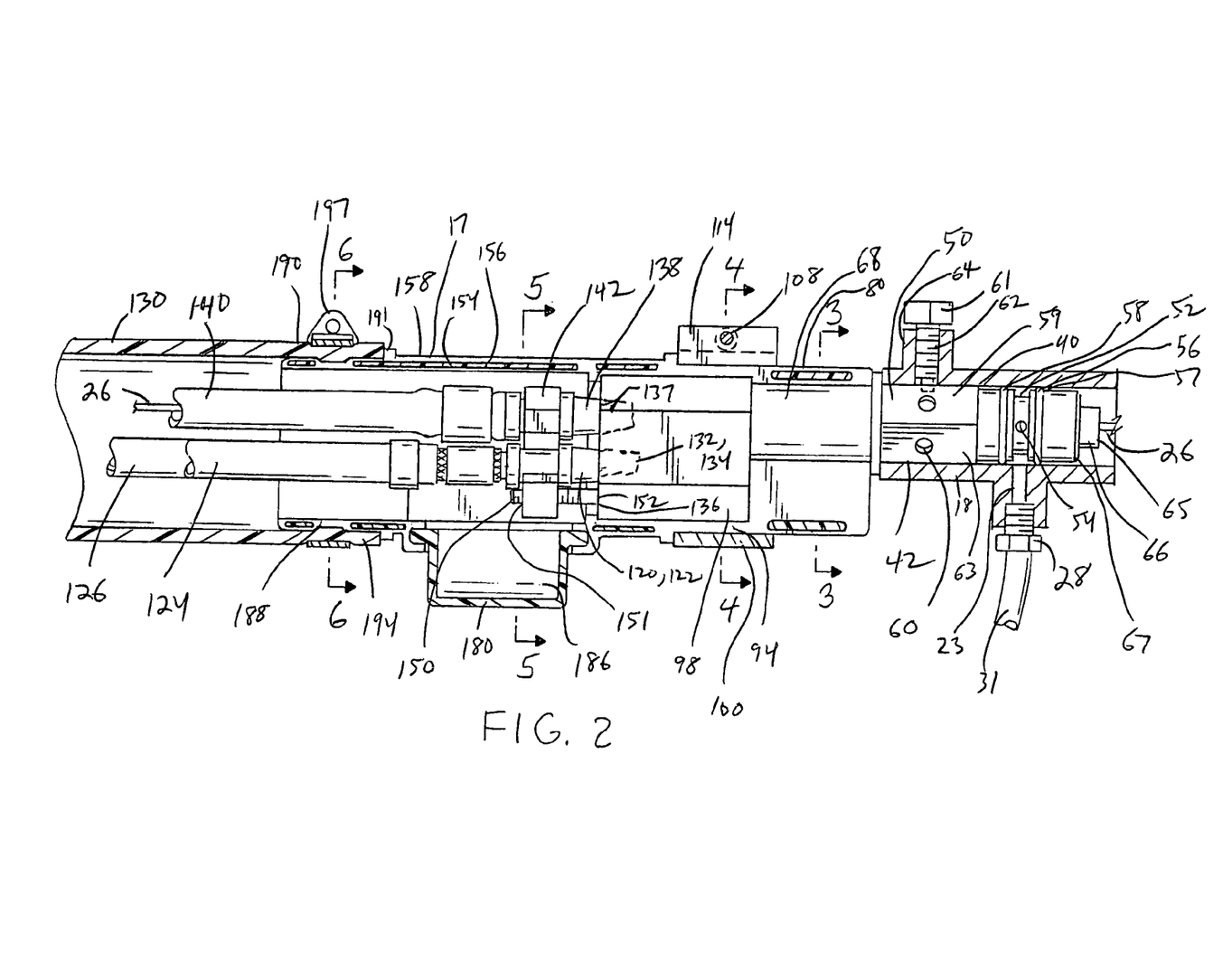
FIG. 2 is a side elevational view in partial cross section, of the integral handle adjacent the welding wire feeder of FIG. 1.

Referring now to FIG. 2, an anti-oxidizing shielding gas, such as argon, carbon dioxide, or other gas as required, is fed into the housing 18, via a port 23. A tube 31 is threadably connected via nut 28 to the port 23. A conventionally used power line 24 is further connected to the wire feeder 19 via a bolted connection 25. The wire feeder housing is secured to the housing 18 via a bolt or other suitable fastener 33 threadably inserted into an opening of feeder housing 19.

Welding wire 26 is inserted into the housing 18; the wire is on a set of motorized reels in wire feeder 19; whereby the wire may be fed forward controllably, in a conventional manner. The wire 26 may be received inside a close-coiled helical spring 30 (FIG. 3), which serves as a guide for the wire on its passage to the welding torch. The above-described arrangements for supplying the welding current, the welding wire, and the gas, into the flexible conduit follow conventional practice as is well known in the welding art.

Continually referring to FIG. 2, housing 18 has a hollow internal cavity 40 for receiving conduit 50. Conduit 50, preferably formed of brass, has an opening formed therein for receiving welding wire 26. The conduit has a grooved section 52 which has a plurality of openings 54 spaced approximately 90° apart. The holes serve as passageways for gas which enters the housing via tubing 31 into opening 37 (FIG. 3) about welding wire 26. A pair of O-rings 56, 58 or other suitable sealing material is received within grooves 57 of the conduit to seal and prevent gas from traveling or escaping into the cavity 40 of the housing 18. The conduit 50 also has a hexagonal shaped portion 59 which is selectively received by a corresponding hexagonal shaped opening 42 of housing 18.

The hexagonal shape of the conduit 50 allows the welding torch to be installed in different positions in the housing. Specifically, the hexagonal portion 59 has six holes 60 spaced approximately 60° apart formed in walls 63 of the conduit, as seen in FIG. 2. The conduit 50 is secured into position with respect to the housing 18 by bolt 61 or another suitable fastener. Bolt 61 extends through opening 62 formed in arm 64 extending radially outwardly from housing 18. The bolt is received by one of the openings 60 in hexagonal portion 59 as shown in FIG. 2.

Shielding gas travels through tube 31 into cavity 40 of housing 18 and then into the spaced apart holes 54 in groove 52. The gas then travels through opening 37 surrounding the wire 26 and spring 30. The wire initially passes through an opening 65 in a separate conduit 66 which is secured to an end member 67 of conduit 50.

Figure 3:
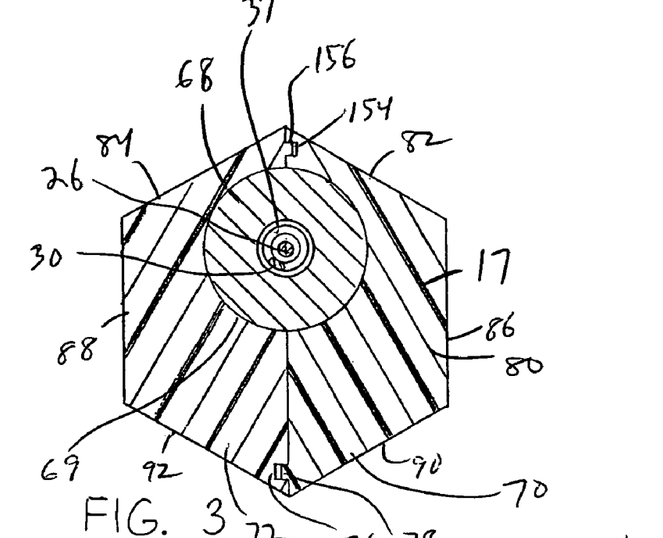
FIG. 3 is a cross-sectional view through line 3-3 of FIG. 2.

Referring to FIG. 3, cylindrical end member 68 of conduit 50 extends into an opening 69 formed by two halves 70, 72 of integral handle or sleeve 17. Integral sleeve 17 is preferably formed of plastic and is formed by two halves 70 and 72

The sleeve further has a first portion 80 which is hexagonally shaped and is generally solid with opening 69 formed adjacent walls 82, 84 of sleeve halves 70 and 72. The sleeve further has walls 86, 88, 90 and 92 which form the hexagonal shape of portion 80.

Figure 4:
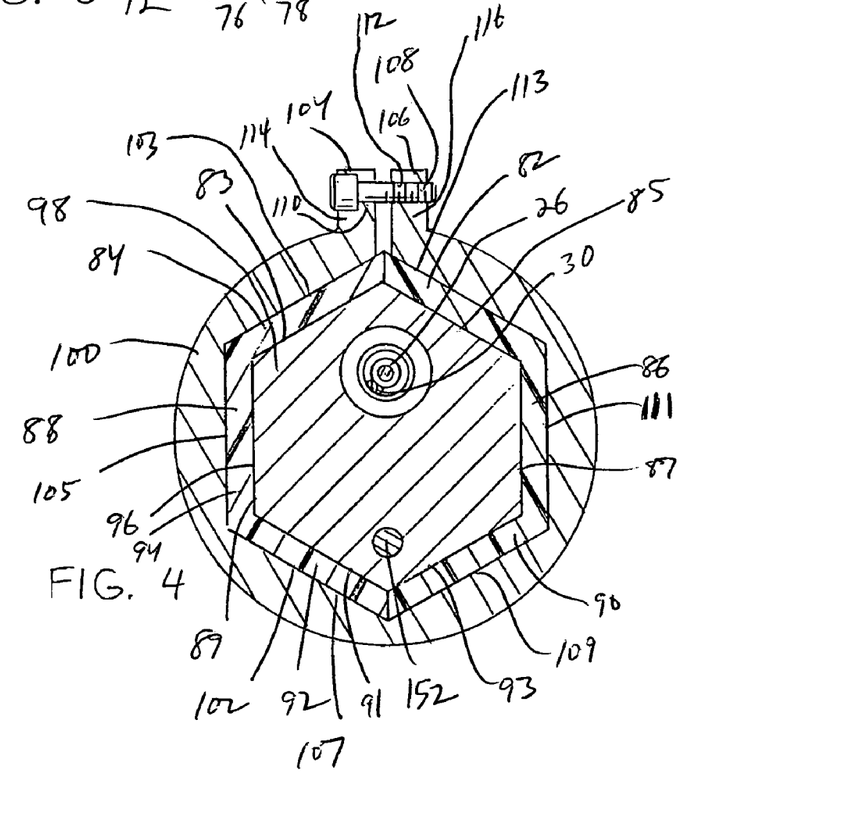
FIG. 4 is a cross-sectional view through line 44 of FIG. 2.

Referring to FIGS. 2 and 4, adjacent to hexagonal portion 80 is second portion 94 which also is hexagonally shaped but has a hexagonal opening 96 formed by walls 82, 84, 86, 88,:90 and 92 of halves 70 and 72. Hexagonal opening 96 is adapted to receive block member 98 which is hexagonally shaped as well. Block 98 is preferably formed of brass and has walls 83, 85, 87, 89, 91 and 93 which form a hexagonal configuration.

Block 98 is hexagonally shaped and is selectively received within hexagonally shaped opening 96 of sleeve 17. Thus, block 98 can be positioned in any one of six positions approximately 60 degrees apart with respect to the sleeve 17.

Referring to FIG. 4, a metal or plastic clamp. 100 extends around outer walls 82, 84, 86, 88, 90 and 92 of sleeve 17. The clamp has an opening 102 formed by walls 103,105,107,109, 111 and 113 which conforms to the hexagonal shape of the sleeve and the block 98. The clamp has two opposing ends 104,106 which are secured together via a bolt fastener 108 which extends through openings 110, 112 formed in arms 114,116. The clamp further secures the two halves 70, 72 of the integral handle 17 together. The handle may be positioned in one of six positions 60 degrees apart with respect to the clamp.

Figure 5:
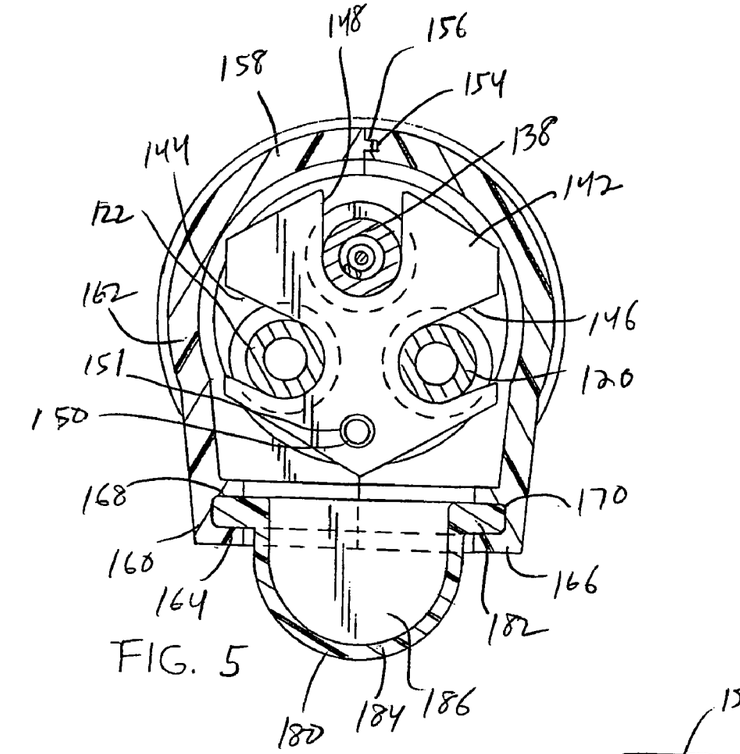
FIG. 5 is a cross-sectional view through line 5-5 of FIG. 2.

Referring to FIGS. 2 and 5, pipe-spigots 120,122 are formed on feed ends of conventionally used power cables 124, 126 which extend through a welding gun plastic flexible sleeve 130 which extends between integral handle 17 and handle 14. The pipe-spigots are inserted into sockets 132, 134 formed in end wall 136 of first block 98. Plug ends of the pipe-spigots can be taper fit into the sockets 132,134. Referring to FIG. 2, first block 98 also has a conically-shaped socket 137 for receiving a tip or pipe-spigot 138 of a welding wire feed tube 140.

When the plug-ends of the pipe-spigots are inserted tightly in the sockets 132, 134, not only are the pipe-spigots secured very well mechanically to the block, but also there is an excellent, low resistance, electrical contact between the pipe-spigots and the block. A length of flexible electrical cable is brazed or soldered into a hole in the pipe-spigots.

As compared with a single cable, dividing the electrical duty between two cables means that each cable can be a little less than half the current-carrying cross-section than the corresponding single cable. The reason each half-cable can be a little less than half the size is that each half-cable is contained in its own respective jacket, whereby cooling of the cable can be enhanced.

When only a single cable was provided, as in conventional designs, the conduit could be quite stiff. As a result, the welding operator found it quite tiring to operate the torch through a working day.

Splitting the cable into two and using two smaller-than-half cables, results in a greater improvement in physical flexibility and manipulability to the conduit; so much so as to extend by hours the period the operator can work comfortably.

Referring to FIG. 5, in order to ensure the pipe-spigots 120, 122, 138 are pressed firmly into the sockets 132,134,137, a plate or draw-ring 142, preferably formed of steel, is provided as shown in FIG. 5. The approximately hexagonal shaped draw-ring has substantially U-shaped slots or cut-outs 144, 146, 148 which engage complementary recesses defined between collars provided on the pipe-spigots.

The draw-ring 142 is separate from the block 98 and can move slightly with respect to the block to adjust the position of the pipe-spigots. When the draw-ring is moved to the right, it urges the pipe-spigots tightly into the sockets 132, 134, 137 in the block 98; when the draw-ring is forced to the left, it disengages the pipe-spigots from the block. The draw-ring 142 is moved to the right by tightening a bolt 150 which is inserted into an opening 151 in the ring and into a corresponding opening 152 in the block. To move the draw-ring to the left, the bolt 150 is slackened, and then the head of the bolt may be tapped to the left to drive the pipe-spigots free from the sockets. (The angle of the taper in the sockets is such that the taper is self-locking). The bolt 150 is screw-threaded into the draw-ring 142 and passes through corresponding plain hole 152 in the block 98.

As described, the cable and wire assembly includes the welding wire 26 inside its guide spring surrounded by tubing 140; and the two electrical cables inside their respective tubes 124,126. It will be noted that the three flexible pipes or tubes 124,126,140 can all have respective central internal "cores" of metal; these "cores" serve to provide excellent resistance to kinking of the pipes and tubes and to other types of mechanical failure. The entire wire and cable assembly is enclosed in sleeve 130.

The wire and cable assembly is therefore very sturdy in the sense of being able to resist the abuse which is always likely to be imposed upon it in a practical welding shop, especially abuse such as snagging, twisting, and the like. On the other hand, none of the components of the wire and cable are thick or heavy, and therefore the assembly is light in weight, and is comparatively very flexible. It is easy for the operator to carry and manipulate a welding torch supported on such an assembly for long periods.

The sleeve further has elongated slots 154 and ribs 156 of varying lengths which extend along a longitudinal length of the sleeve halves. The sleeve has a cylindrical shape portion 158 through which the slots and ribs extend. Corresponding ribs and slots matingly engage each other to snap or secure halves 70, 72 of the handle together.

Figure 9:
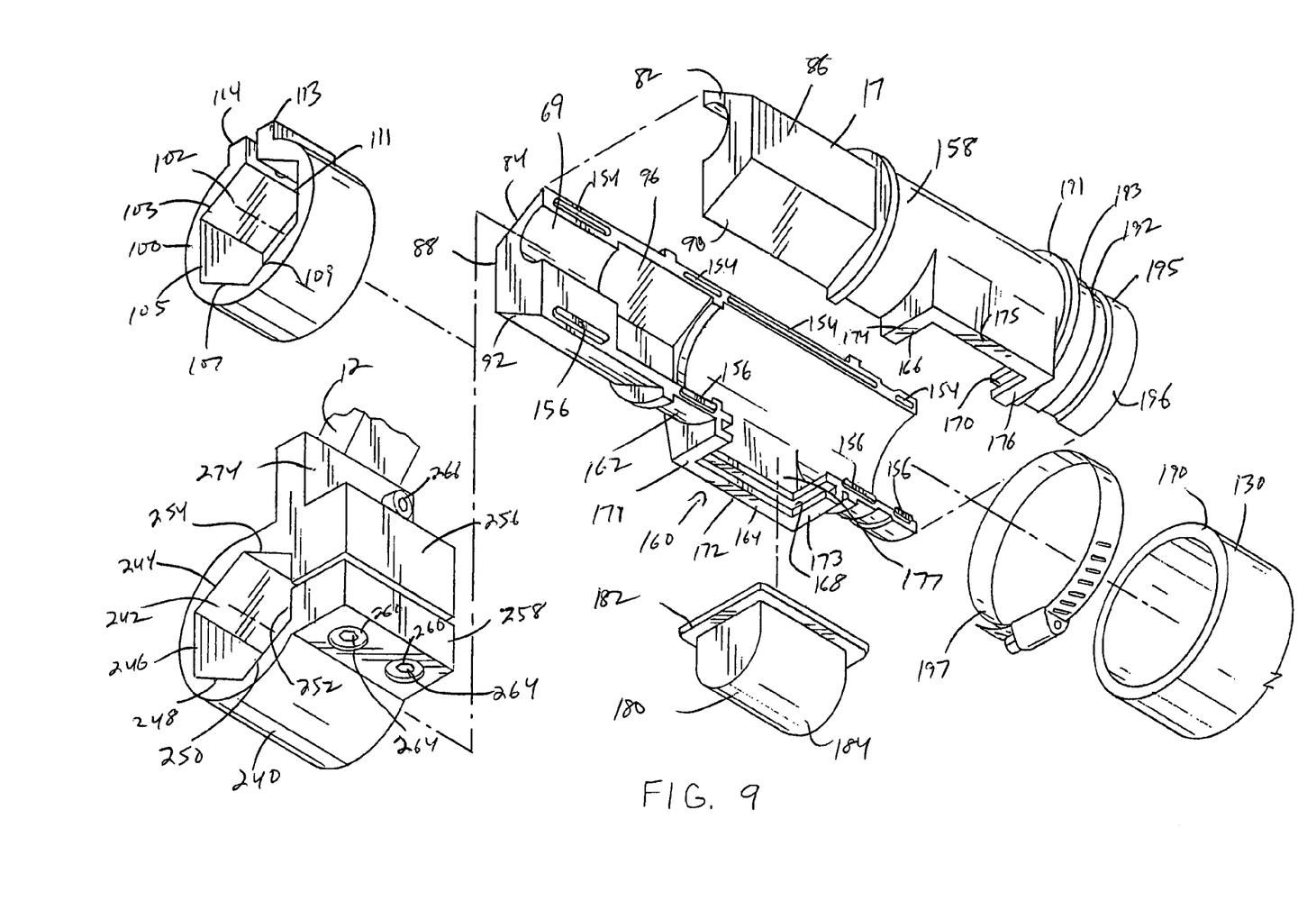
FIG. 9 is an exploded perspective view of the integral handle of FIG. 7.

Referring to FIGS. 5 and 9, a projecting or extending member 160 is formed on an outer surface 162 of the cylindrical portion 158 and includes two halves 164,166. Each half has a groove 168, 170 formed therein. The projecting member is shown to be rectangular in shape; however, other configurations can be used without departing from the scope of the invention. Referring to FIG. 9, each half also has an opening 177 formed by three side walls, 171,172,173,174,175,176 which together form a generally rectangular shaped opening. The opening permits access to the internal components of the welding gun, such as the power cables and the welding wire tubing. Also, the trigger for the welding gun handle assembly may be positioned within the opening. A trigger can be included in the handle, which, when operated, activates the welding current, starts the wire feed-motor, etc., back at the service station.

As shown in FIGS. 5 and 9, a cap 180 may be slidably inserted into the grooves 168,170 of the sleeve. Flange 182 of the cap is inserted into the grooves and the cap covers the opening 177. The cap 180 has a ridge or flange 182 which extends around an outer surface thereof. The flange is slidably received within grooves 168, 170 of the sleeve. The cap further has a top portion or housing 184 which has a hollow cavity 186 therein. The housing 184 can enclose internal components for a trigger assembly such as wiring, conduit tubing, etc. The cap provides easy access to the internal cavity of the sleeve and to the power lines and welding wire tube.

Figure 6:
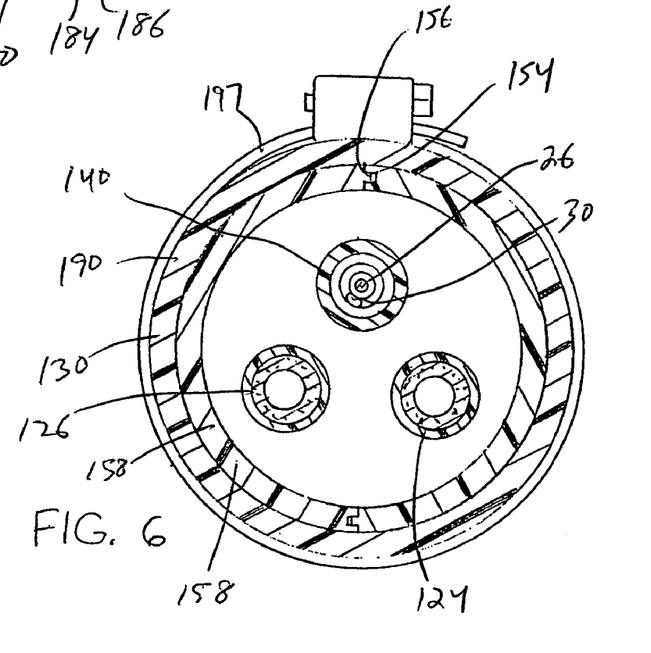
FIG. 6 is a cross-sectional view through line 6-6 of FIG. 2.

Referring to FIGS. 2 and 6, the cylindrical portion 158 of the sleeve has a distal end 188 which is secured to or engages an end portion 190 of conduit 130. A collar or flange 191 extends from the sleeve and abuts the end portion 190 of conduit 130. As seen in FIGS. 2 and 9, the sleeve can have a groove 192 formed between two outer walls 193, 195 at end 196 which matingly engages a corresponding rib 194 on an inner diameter of conduit 130. To secure the sleeve to the conduit, a conventional hose clamp 197, such as one made from metal or plastic, can be used to tighten around the outer surface of the sleeve to secure the sleeve or handle to the conduit 130. Thus, the handle or sleeve 17 may be secured to the conduit tube 130 without the need for screws or other fasteners.

Figure 7:
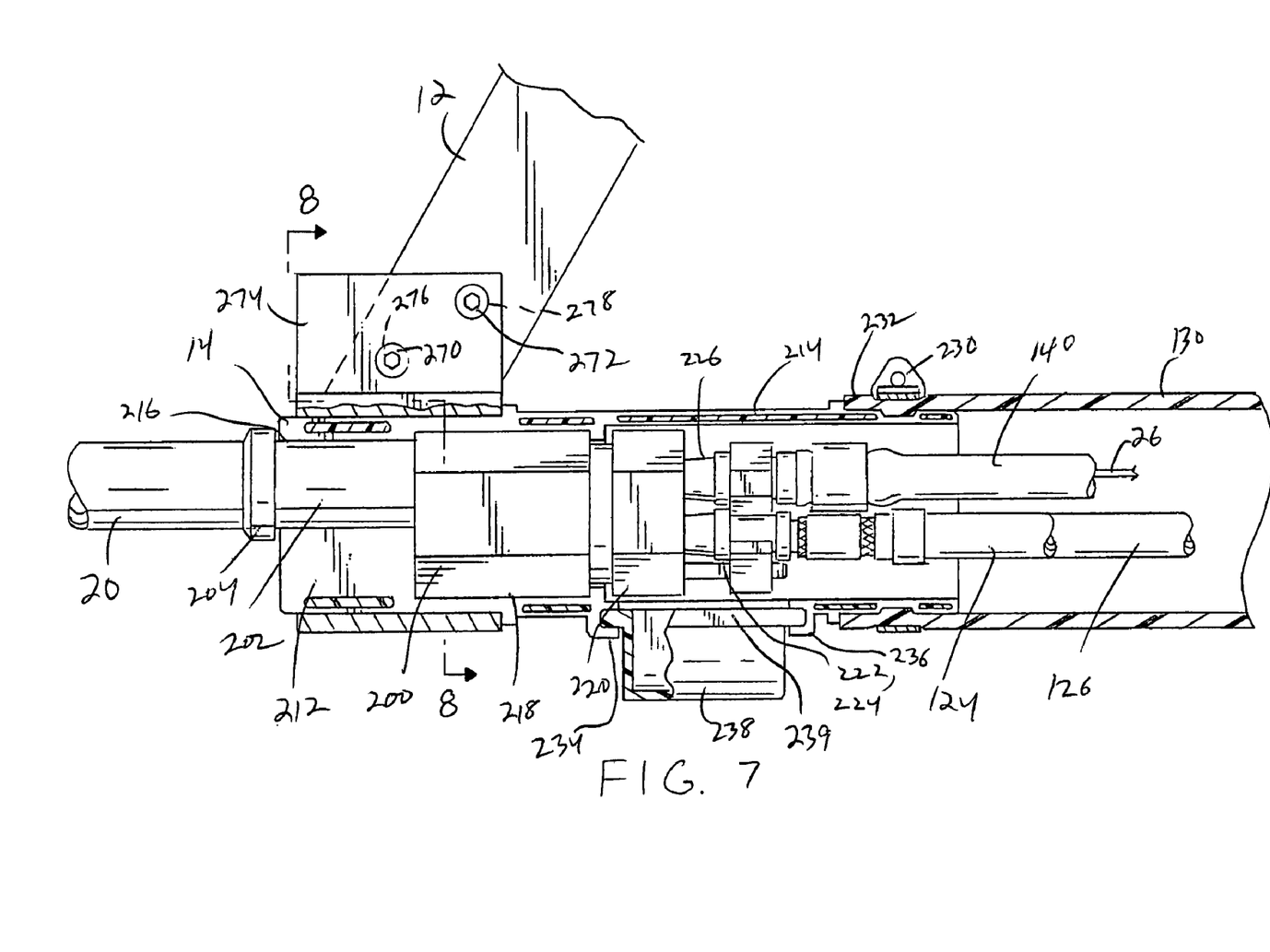
FIG. 7 is a side-elevational view, in partial cross-section of the integral handle adjacent the welding torch of FIG. 1.

The other, front or supply end of the welding gun adjacent to the torch, will now be described. The gooseneck 20 extends between the torch nozzle 21 and first or front housing 14. Referring to FIG. 7, a second block 200, also formed of brass, is secured to an end portion of second conduit 202 which extends from end 204 of the gooseneck. Block 200 has an opening 201 for receiving the welding wire 26 and spring 30.

A second sleeve 14 is essentially the mirror image of sleeve 17. That is, the sleeve or handle can be positioned in reversed positions 180 degrees apart on the welding gun. Accordingly, the detailed description of sleeve 17 also applies for sleeve 14. Sleeve 14 also has a hexagonal portion 212 and a cylindrical portion 214. Hexagonal portion has a cylindrical opening 216 for receiving conduit 202. A second hexagonal opening 218 formed by walls 209, 211, 213, 215, 217 and 219 receives walls 221, 223, 235, 227, 229 and 231 of hexagonal brass block 200. Block 200 can be positioned in one of six positions 60 degrees apart with respect to sleeve 14. A second draw ring 220 connected by a bolt 275 receives pipe-spigots 222, 224 of power cables 124,126 and pipe-spigot 226 of welding wire feed tube 140. A clamp 230 is used to hold the sleeve on a distal end 232 of conduit 130. Thus, the handle or sleeve 14 may be secured to the conduit tube 130 without the need for screws or other fasteners. Sleeve 14 also has extension 234 which has grooves 236 for receiving a cap 238 covering an access opening 239. The handle and conduit can be easily disassembled by simply loosening and removing the clamp 197.

Figure 8:
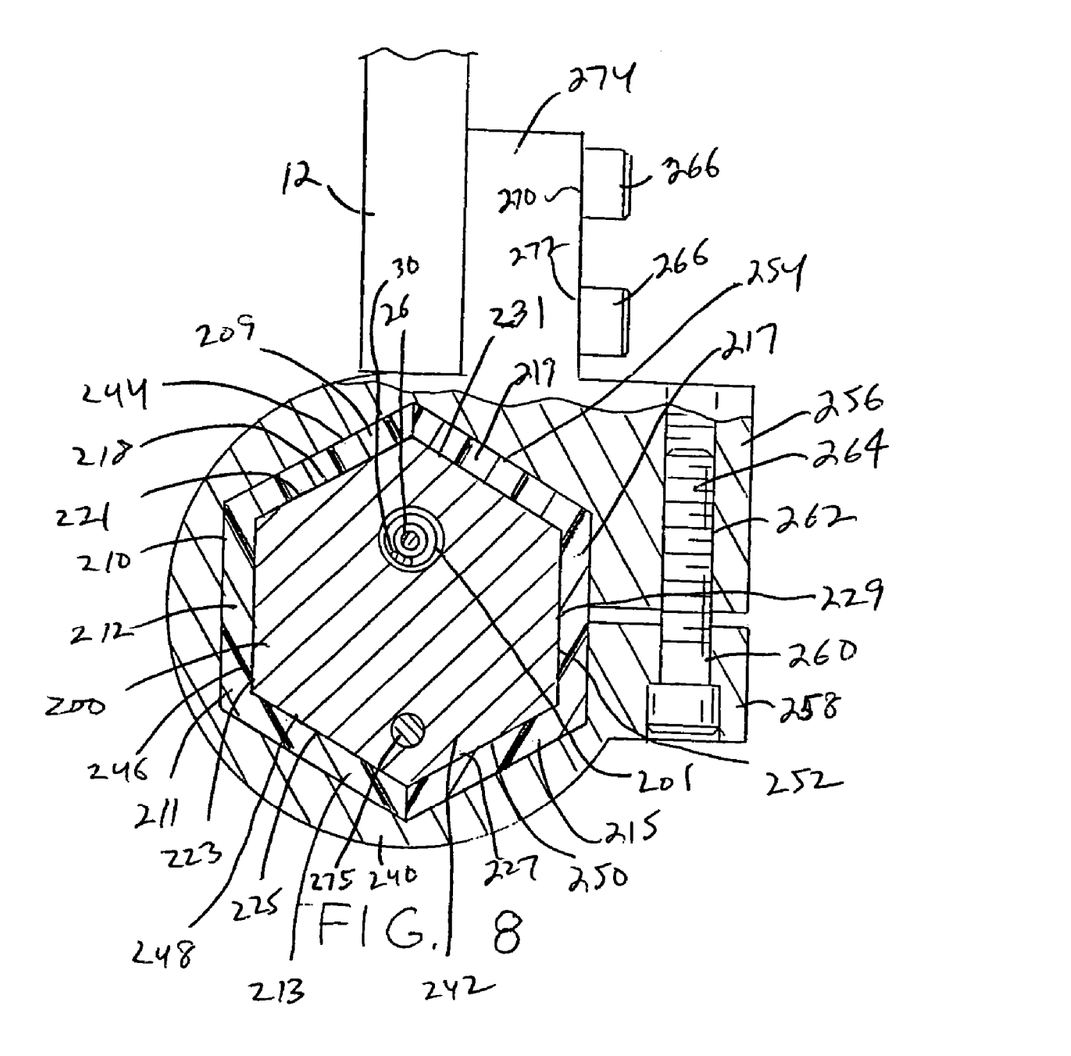
FIG. 8 is a cross-sectional view, along line 8-8 of FIG. 1.

Referring to FIG. 8, a mounting bracket 240 receives the sleeve 200. The bracket has a hexagonally shaped opening 242 formed by walls 244, 246, 248, 250, 252, 254. The bracket has two walls 256, 258 which are substantially parallel to each other and form a gap therebetween so that the bracket can expand slightly to remove or install the sleeve 200 in the opening 242. Each wall 256, 258 has a threaded openings 260, 262 therein for receiving a fastener or threaded member 264 therethrough to clamp the sleeve within the mounting bracket. The bracket in turn is secured to mounting arm 12 by two bolts or fasteners 266 which extend through openings 270, 272 in bracket arm 274 into openings 276, 278 in arm 12.

The hexagonal shape of the sleeve 14 as well as the opening 242 of the mounting bracket allows the sleeve, and the welding torch to be positioned in one of six positions approximately 60 degrees apart with respect to the mounting bracket of a robotic arm 12. Such a robotic arm assembly is discussed in co-pending application Ser. No. 11/178/819, filed on Jul. 11, 2005, incorporated herein by reference.

The pipe-spigots may be secured into the block by means of the tapered sockets formed in end wall of block, or, alternatively, the pipe-spigots may be secured into a block by means of screw-threads. The block, preferably made of brass, and the plugs are brazed into the drilling as required: as a general rule in welding torches, the use of rubber seals should be avoided except where the sealed components have to be detachable. Because of the very tight restriction on the radial space envelope in the torch handle, the room available for the spigot-to-block connection, whatever its structure is severely limited. It is recognized that if this small space were occupied by a screw-thread connection, the constraints would be so tight that the screw-thread connection at that location would be unreliable. That is, if the pipe-spigot were secured into the block by means of a screw-thread connection, the screw-thread would be so small that there would be a danger that the thread would strip, even with just a small degree of abuse. It may be noted also that the components in question are generally made of brass, which material has no great resistance to the stripping of threads if over-tightened.

The connection as described has good electrical properties. When assembled, the pipe-spigot becomes tightly wedged into the socket, which gives an excellent, large-contact-area, electrical connection for the heavy welding currents.

Preferably, the pipe-spigots at the service-station end should be identical to the spigots at the torch end. Although there is no premium on radial space at the service station end of the conduit, it is simpler to have components the same.

Although two electrical power pipes have been described, more than two may be provided. The draw-ring and draw bolt arrangement can be used to tighten more than two pipe-spigots into place (simultaneously) into suitable sockets.

Figure 10:
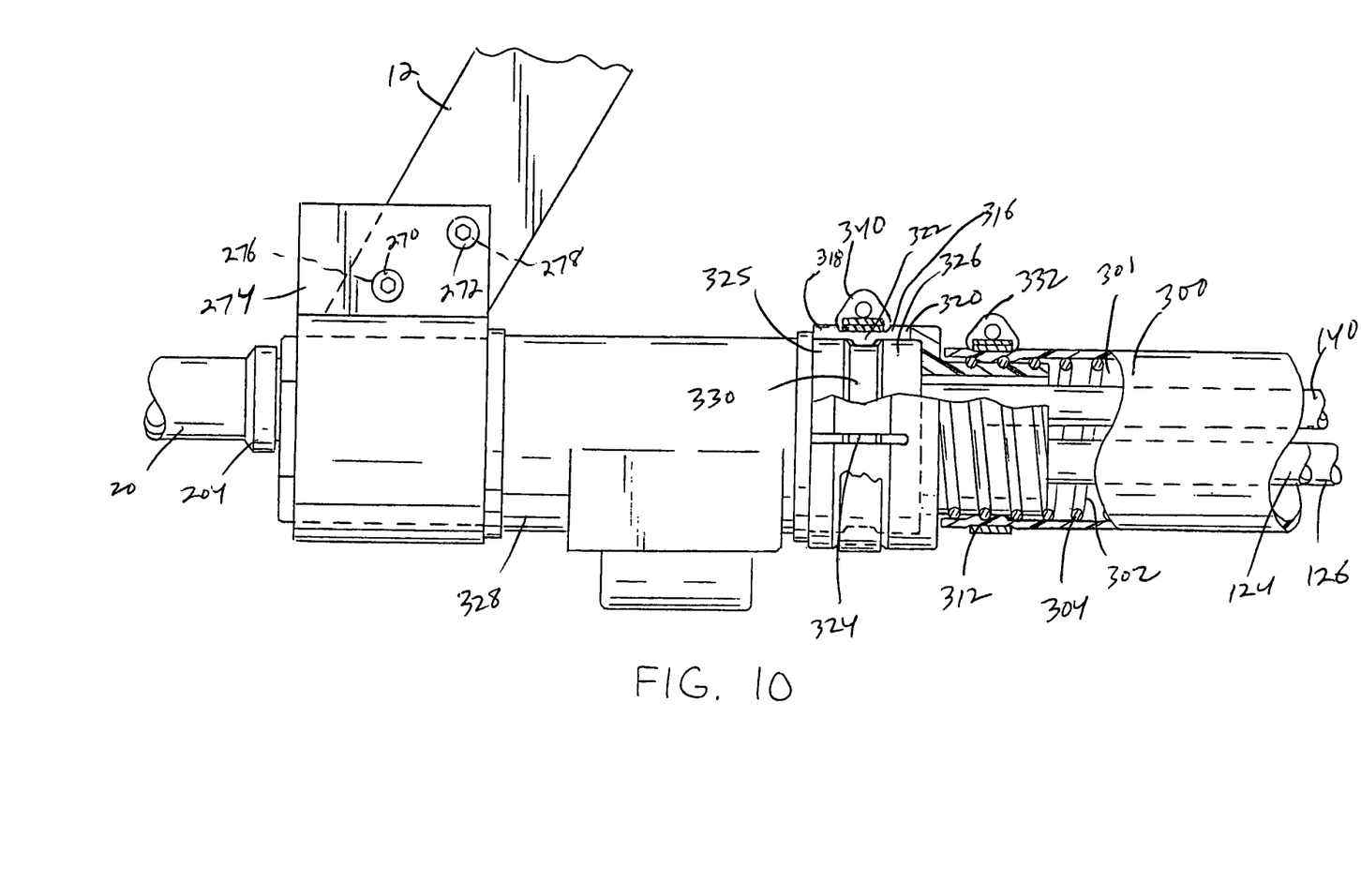
FIG. 10 is a side elevational view, in partial cross-section, of an integral handle in accordance with an alternate embodiment of the present invention; and, FIG. 11 is an exploded perspective view of the integral handle of FIG. 10.
Figure 11:
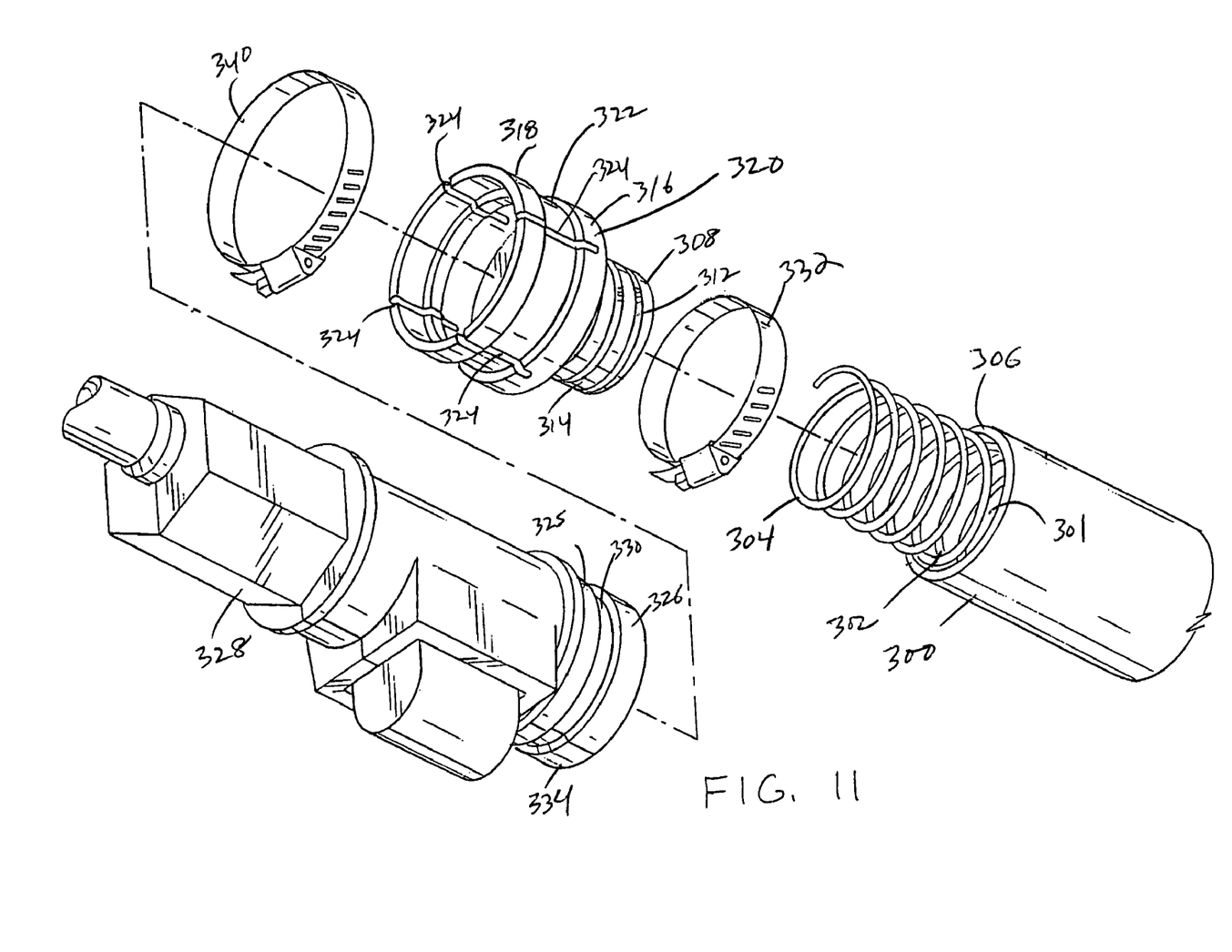

Referring now to FIGS. 10-11, an alternative embodiment is shown. FIGS. 10 and 11 illustrate the addition of a coiled spring to the integral handle and to the conduit. The coiled spring is added to prevent or minimize kinking of the flexible conduit cable 300 as the conduit is moved by the robotic arm assembly.

More particularly, conduit 300, preferably formed of flexible plastic, has a spiraled groove 302 formed on an internal wall 301 of the conduit extending along the longitudinal length of the conduit. A coiled spring 304, preferably made of metal is installed within the conduit and is press fit or otherwise engages the groove 302 formed in the internal wall of the conduit. The spring provides resilience and rigidity to the conduit and allows the conduit to bend without kinking. The spring extends outwardly from an end wall 306 of the conduit and onto an end wall 308 of an adapter 310. The adapter is preferably formed of thermoplastic material. The adapter has end member 308 which has an outer diameter slightly less than an inner diameter of wall 301 of the conduit 300. The end wall 308 is inserted into end wall 306 of conduit 300. Adapter end 308 also has a spiraled groove 312 formed on an outer wall 314 of the end 308 corresponding to the groove 302 on inner wall 301 of the conduit. The adapter also has end 316 which includes walls 318 and 320 which have a groove 322 formed therebetween. Walls 318 and 320 have inner diameters which correspond to outer diameters of walls 325, 326 of sleeve 328. Similarly, groove 322 has an inner diameter corresponding to the outer diameter of groove 330 of the sleeve.

The adapter has a plurality of slots 324 formed around the circumference of the adapter and through walls 318, 320 and groove 322 to enable the adapter to expand slightly to be installed onto and over the walls 325, 326 of sleeve 328.

Referring to FIGS. 10 and 11, the adapter end 308 is inserted into end 306 of the conduit until wall 316 abuts end 306 of the conduit. Then, a conventional hose clamp 332 is placed over the conduit end 306 and is tightened to secure the end of the adapter to the end of the conduit. End 316 of the adapter is installed over end 334 of the sleeve such that walls 318 and 320 aligns with walls 325, 326 and groove 322 aligns with groove 330 of the sleeve. Then, another hose clamp 340 is placed into groove 322 and is tightened to secure the adapter onto the sleeve.

One aspect of the integral handle is that the handle is secured to a conduit tube without the need for screws or other fasteners. The handle is inserted into the conduit and clamped or threaded into place. Another aspect of the internal handle is that it can be installed at either or both of the torch and wire feeder ends of the welding gun assembly. Yet another aspect of the handle is that the handle is reversible or able to be installed in positions 180 degrees apart. Still another aspect of the handle is an opening formed therein to provide access to the internal components or a switch for the welding gun. Yet another aspect of the handle integral handle is that it is formed of two halves which enable the handle to be easily installed and removed from the welding gun. Still another aspect of the handle is the provision of providing a coiled spring within the conduit and within an adapter which is installed into the integral handle to prevent kinking of the conduit hose.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A welding gun assembly for directing a welding wire toward a workpiece, comprising:
    a torch positioned at a forward portion of the gun;
    a first handle positioned toward a rearward portion of the gun;
    a flexible conduit extending between the first handle and a second handle, the conduit containing one or more power cables and a welding wire cable;
    said first handle comprising:
        an outer perimeter surface extending axially in a lengthwise direction between opposing first and second ends of said first handle to generally form an exterior casing about an interior of the first handle;
        a first portion and a second portion positioned axially between said ends, the first portion being positioned adjacent to the first end of the handle, and the second portion being positioned axially adjacent to the first portion;
            said first portion having an opening receiving welding wire, said opening extending axially through said first portion;
            said second portion having: a first opening located adjacent the first portion for receiving a welding wire from the first portion; a chamber containing a removable block, said block having a welding wire opening for receiving the welding wire from the first opening, said welding wire opening extending through an axial length of said block, said block further including one or more power cable openings each for receiving a corresponding power cable from a second opening of the second portion, the second opening being located axially opposite the first opening about the chamber such that the welding wire passes through the second opening after extending through the removable block;
    said second handle comprising:
        an outer perimeter surface extending axially in a lengthwise direction between opposing first and second ends of said second handle to generally form an exterior casing about an interior of the second handle, a portion of the outer perimeter surface forming a mounting surface for a robotic arm;
        a first portion and a second portion positioned axially between said ends, the first portion being positioned adjacent to the first end of the handle, and the second portion being positioned axially adjacent to the first portion;
            said first portion having an opening containing welding wire received from the second portion of the second handle for delivery to the torch, which is attached to the first end of the second handle, said opening extending axially through said first portion;
            said second portion having: a first opening located adjacent the first portion for receiving a welding wire from a removable block contained within a chamber positioned between the first opening and a second opening of the second portion of the second handle, said block having a welding wire opening receiving the welding wire from the second opening of the second portion of the second handle, said welding wire opening extending through an axial length of said block, said block further including one or more power cable openings for receiving a corresponding power cable from the second opening of the second portion, the second opening being located axially opposite the first opening about the chamber such that the welding wire passes through the first opening after extending through the removable block;
    wherein the conduit extending between the first and second handles is operably attached to the second end of the first handle and a second end of the second handle,
    wherein each of the corresponding one or more of the power cable openings in each block of the first and second handles form a socket for receiving a pipe-spigot of said one or more power cables, and wherein the welding wire opening in each block of the first and second handles comprises a socket for receiving a pipe-spigot of said welding wire cable.

2. The welding gun assembly of claim 1, wherein the perimeter surface adjacent said second end of said first handle is cylindrical in shape.

3. The welding gun assembly of claim 2, wherein the perimeter surface associated with said first portion of the first handle is hexagonal in shape.

4. The welding gun assembly of claim 1, wherein said opening of said first portion of the first handle is cylindrical in shape.

5. The welding gun assembly of claim 4, wherein said opening of said second portion of the first handle is hexagonal in shape.

6. The welding gun assembly of claim 1, further comprising a conduit selectively received within said opening of said first portion, said conduit delivering welding wire to said first handle from a wire feeder.

7. The welding gun assembly of claim 5, wherein the block of the first handle is hexagonally shaped.

8. The welding gun assembly of claim 1, further comprising an end plate positioned adjacent to the block within the interior of the first handle and opposite said first portion, the end plate comprising a plurality of slots for receiving said pipe-spigots of said one or more power cables and said welding wire cable.

9. The welding gun assembly of claim 1, wherein said first handle further comprises an annular groove formed in the portion of the perimeter associated with said second portion.

10. The welding gun assembly of claim 9, wherein said conduit comprises a rib formed on an inner wall of said conduit, said rib engages said groove of said first handle.

11. The welding gun assembly of claim 1, wherein said first handle comprises a flange which abuts an end of the conduit extending between the first and second handles.

12. The welding gun assembly of claim 1, wherein said first handle is formed by two half portions.

13. The welding gun assembly of claim 12, wherein each of said handle half portions comprises at least one slot and at least one rib.

14. The welding gun assembly of claim 13, wherein said at least one slot of one of said handle half portions engages said at least one rib of said other of said handle half portions.

15. The welding gun assembly of claim 1, wherein said first handle is formed of plastic material.

16. The welding gun assembly of claim 12, wherein said handle half portions are secured together with a clamp which has a hexagonal opening therein to receive said second portion of said handle.

17. The welding gun assembly of claim 16, wherein said clamp comprises a pair of walls formed at opposite ends of said clamp.

18. The welding gun assembly of claim 17, wherein said walls of said clamp each has an opening therein for receiving a fastener.

19. The welding gun assembly of claim 1, wherein the outer perimeter surface of each of said first portion and said second portion of said second handle is hexagonally shaped.

20. The welding gun assembly of claim 1, further comprising an end plate positioned adjacent to the block within said interior of the second handle and opposite said first portion, the end plate comprising a plurality of slots for receiving said pipe-spigots of said one or more power cables and said welding wire cable.

21. The welding gun assembly of claim 1, wherein said second handle is secured to said first conduit via a hose clamp.

22. The welding gun assembly of claim 21, wherein said second handle further comprises an annular groove formed in an outer wall of said cylindrical portion.

23. The welding gun assembly of claim 22, wherein said conduit comprises a rib formed on an inner wall of said conduit, said rib engages said groove of said second handle.

24. The welding gun assembly of claim 1, wherein said second handle is formed by two half portions.

25. The welding gun assembly of claim 24, which each of said second handle half portions comprises at least one slot and at least one rib.

26. The welding gun assembly of claim 25, wherein said at least one slot of one of said second handle half portions engages said at least one rib of said other of said second handle half portions.

27. The welding gun assembly of claim 19, further comprising a mounting bracket having a hexagonal opening therein for selectively receiving a portion of said second handle.

28. The welding gun assembly of claim 27, wherein said mounting bracket further comprises a pair of walls which are spaced apart and each has an at least one opening therein for receiving a fastener.

29. The welding gun assembly of claim 28, wherein said pair of walls of said mounting bracket can be pulled slightly apart to increase the size of said hexagonal opening of said mounting bracket to facilitate removal of said hexagonal portion of said second handle from said mounting bracket.

30. The welding gun assembly of claim 29, wherein said mounting bracket comprises an arm extending therefrom, said arm comprising at least one opening therein for receiving a fastener for securing said bracket to a mounting arm of a robotic arm assembly.

31. The welding gun assembly of claim 1, wherein said first handle further includes a user access opening extending axially along said perimeter surface and adjacent to the block to provide access into said first handle.

32. The welding gun assembly of claim 31, further comprising an extension member formed adjacent said access opening of said first handle.

33. The welding gun assembly of claim 32, further comprising a removable cap which is selectively received by said extension member.

34. The welding gun assembly of claim 33, wherein said cap comprises a flange which is received within a groove of said extension member.

35. The welding gun assembly of claim 33, wherein said cap comprises an internal cavity formed by a wall thereof.

36. The welding gun assembly of claim 35, wherein said cap is rectangular in shape.

37. The welding gun assembly of claim 36, wherein said access opening of said extension member is rectangular in shape.

38. The welding gun assembly of claim 8, further comprising a threaded fastener for adjusting the position of said end plate relative to said block.

39. The welding gun assembly of claim 6, wherein said second conduit includes a first end extending within the opening of first portion of said first handle and a second end positioned within a cavity of a housing, said conduit second end including a grooved section having a one or more holes for communicating gas received by the housing to said welding wire.

40. The welding gun assembly of claim 39, wherein one or more sealing members are positioned adjacent to said one or more holes to restrict the flow of gas into said cavity.

41. The welding gun assembly of claim 39, wherein a fastener extends through housing and into an aperture located within said second conduit to retain said second conduit within said housing.

42. The welding gun assembly of claim 31, wherein said access opening is configured to receive a trigger.

43. The welding gun assembly of claim 32, wherein said extension member is configured to receive a trigger.

44. The welding gun assembly of claim 1, wherein said second handle further includes a user access opening extending axially along said perimeter surface to provide access into said second handle.

45. The welding gun assembly of claim 44, wherein said second handle comprises an extension member formed adjacent said access opening.

46. The welding gun assembly of claim 43, wherein said extension member of said second handle comprises a groove formed adjacent said opening.

47. The welding gun assembly of claim 46, further comprising a cap which is selectively received by said extension member.

48. The welding gun assembly of claim 47, wherein said cap comprises a flange which is received within said groove of said extension member.

49. The welding gun of claim 1, wherein the opening of said first portion is positioned adjacent to the opening of the second portion.

50. The welding gun of claim 1, wherein the opening of said first portion is positioned adjacent to the opening of the second portion.

* * * * *

UNITED STATES PATENT AND TRADEMARK OFFICE
CERTIFICATE OF CORRECTION

| | | |
|---|---|---|
| PATENT NO. | : 7,800,017 B2 | Page 1 of 1 |
| APPLICATION NO. | : 11/274953 | |
| DATED | : September 21, 2010 | |
| INVENTOR(S) | : Frank Zamuner | |

It is certified that error appears in the above-identified patent and that said Letters Patent is hereby corrected as shown below:

Col. 12, line 47; In Claim 46, line 1, "43" should read --45--.

Signed and Sealed this
Eighteenth Day of January, 2011

David J. Kappos
*Director of the United States Patent and Trademark Office*